(12) United States Patent
Zhang et al.

(10) Patent No.: US 10,935,750 B2
(45) Date of Patent: Mar. 2, 2021

(54) VOICE COIL MOTOR

(71) Applicants: TRIPLE WIN TECHNOLOGY(SHENZHEN) CO.LTD., Shenzhen (CN); HON HAI PRECISION INDUSTRY CO., LTD., New Taipei (TW)

(72) Inventors: Long-Fei Zhang, Guangdong (CN); Shin-Wen Chen, New Taipei (TW); Xiao-Mei Ma, Guangdong (CN); Kun Li, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 104 days.

(21) Appl. No.: 16/101,707

(22) Filed: Aug. 13, 2018

(65) Prior Publication Data

US 2019/0377154 A1  Dec. 12, 2019

(30) Foreign Application Priority Data

Jun. 12, 2018 (CN) .......................... 201810602045.4

(51) Int. Cl.
   *G02B 7/04* (2006.01)
(52) U.S. Cl.
   CPC ........ *G02B 7/04* (2013.01); *G03B 2205/0069* (2013.01)

(58) Field of Classification Search
   None
   See application file for complete search history.

(56) References Cited

U.S. PATENT DOCUMENTS

| 2015/0124162 | A1* | 5/2015 | Park .................... H04N 5/2257 348/374 |
| 2016/0028297 | A1* | 1/2016 | Hsu ......................... G02B 7/09 359/824 |
| 2018/0372987 | A1 | 12/2018 | Tseng et al. |
| 2019/0011665 | A1* | 1/2019 | Huang ..................... G02B 7/09 |

FOREIGN PATENT DOCUMENTS

| CN | 101604063 | 12/2009 |
| CN | 204302559 | 4/2015 |
| TW | M548802 | 9/2017 |

* cited by examiner

*Primary Examiner* — William R Alexander
*Assistant Examiner* — Gary W O'Neill
(74) *Attorney, Agent, or Firm* — ScienBiziP, P.C.

(57) ABSTRACT

A voice coil motor of reduced thickness includes a pedestal and a housing. The side walls of the pedestal are formed with a metal sheet. The housing includes top and side plates, the side plates perpendicularly extending from an edge of the top plate. The side plate is notched, the housing covers the pedestal, and the at least one notch exposes a portion of the metal sheet for purposes of attachment between fixation area the housing and the pedestal fixation area.

16 Claims, 6 Drawing Sheets

VOICE COIL MOTOR

FIELD

The subject matter herein generally relates to voice coil motor of reduced thickness.

BACKGROUND

A voice coil motor is configured to drive lenses along an optical axis in image capturing devices thereby achieving an auto-focus function of the image capturing device. However, the thinner the voice coil motor and pedestal, the less is the effective travel of the lens. However, a thin pedestal has reduced strength, and can be easily detached from the housing.

Therefore, it is desirable to provide a better voice coil motor.

BRIEF DESCRIPTION OF THE DRAWINGS

Implementations of the present technology will now be described, by way of example only, with reference to the attached figures.

DETAILED DESCRIPTION

Figure 1:
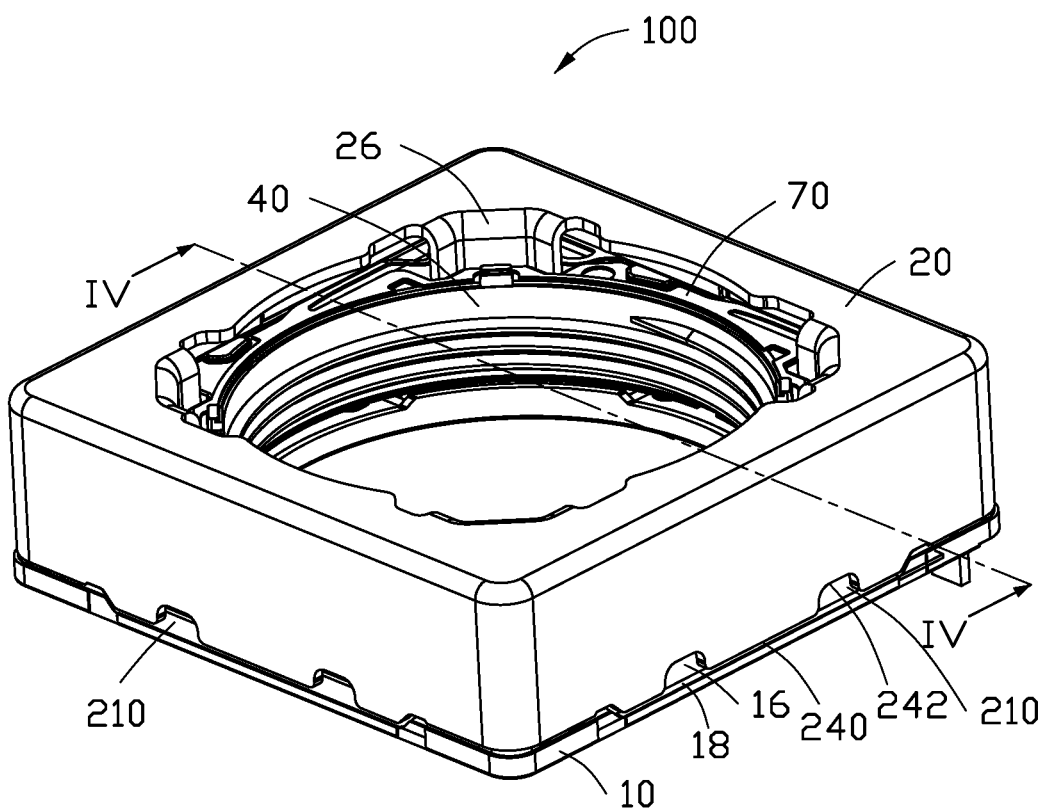
FIG. 1 is an isometric view of a voice coil motor in accordance with one embodiment.
Figure 2:
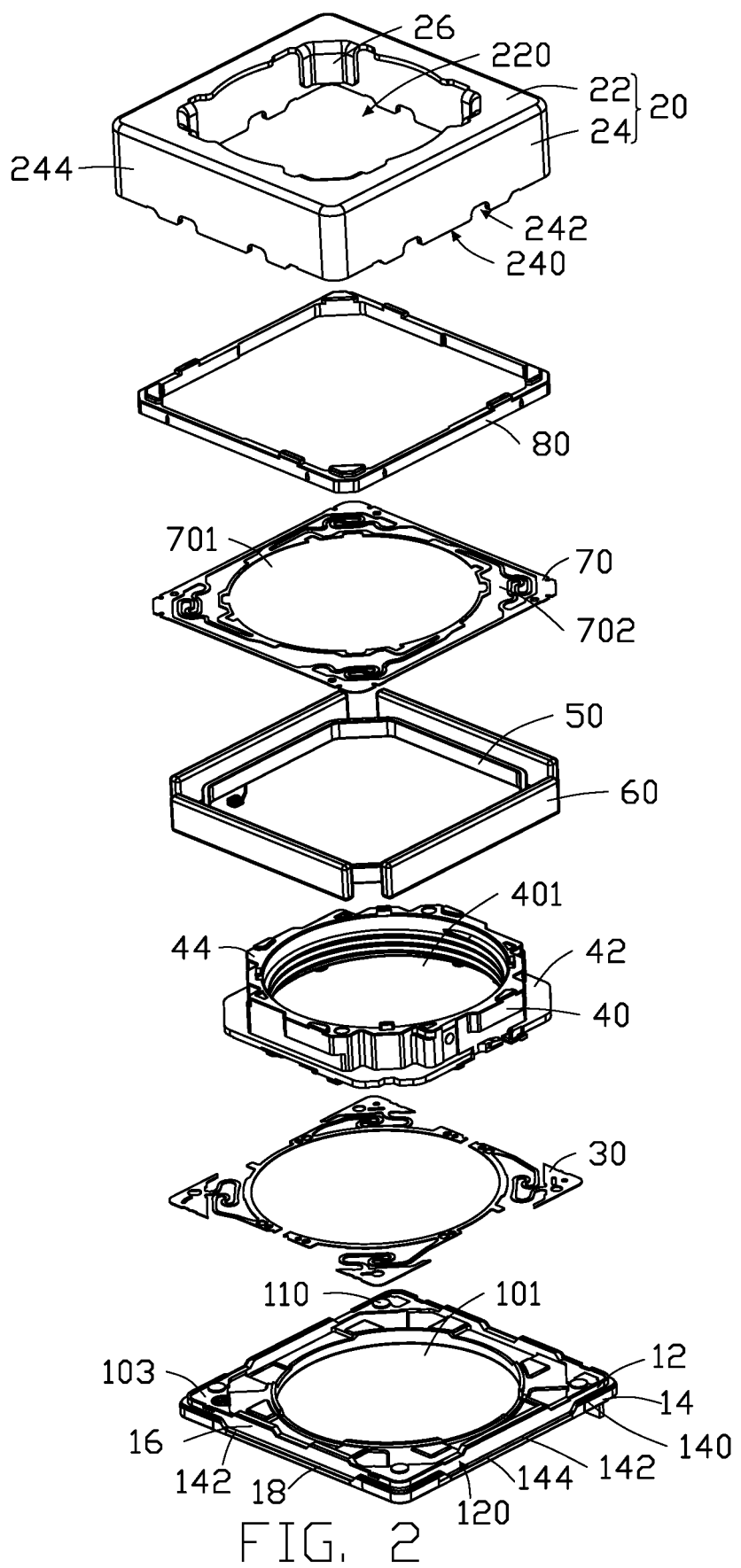
FIG. 2 is an exploded isometric view of the voice coil motor in FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a voice coil motor 100 according to one embodiment. The voice coil motor 100 includes a pedestal 10, a housing 20, a lower elastic member 30, a movable assembly 40, a wire coil 50, a group of magnets 60, an upper elastic member 70, and a fixation frame 80.

In the illustrated embodiment, the pedestal 10 is made from plastic. The pedestal 10 is substantially square and includes a bottom through hole 101 for entry of light. The pedestal 10 includes a top surface 103 and a side wall 12 perpendicularly connected an edge of the top surface 103. The side wall 12 includes four connected side surfaces 120. A first flange 14 is formed on the side wall 12. The first flange 14 on each side surface 120 includes a cutout 142 to expose center of each side surface 120. The cutout 142 includes a stepping surface 144 perpendicular to the side surface 120.

Each side surface 120 is formed with a first metal sheet 16. Each stepping surface 144 is formed with a second metal sheet 18, the first metal sheet 16 being perpendicular to the second metal sheet 18. The first metal sheet 16 and the second metal sheet 18 are configured to increase strength of the pedestal 10, by strengthening the fixation between the pedestal 10 and the housing 20. In the illustrated embodiment, the first metal sheet 16 and the second metal sheet 18 are formed by insert molding. That is, the first metal sheet 16 and the second metal sheet 18 are embedded in the shape of the pedestal 10 when forming the pedestal 10 by mold-injection.

The top surface 103 includes a number of guiding posts 110 at each corner. The lower elastic member 30 is mounted on the pedestal 10 and set up on the guiding posts 110.

Figure 3:
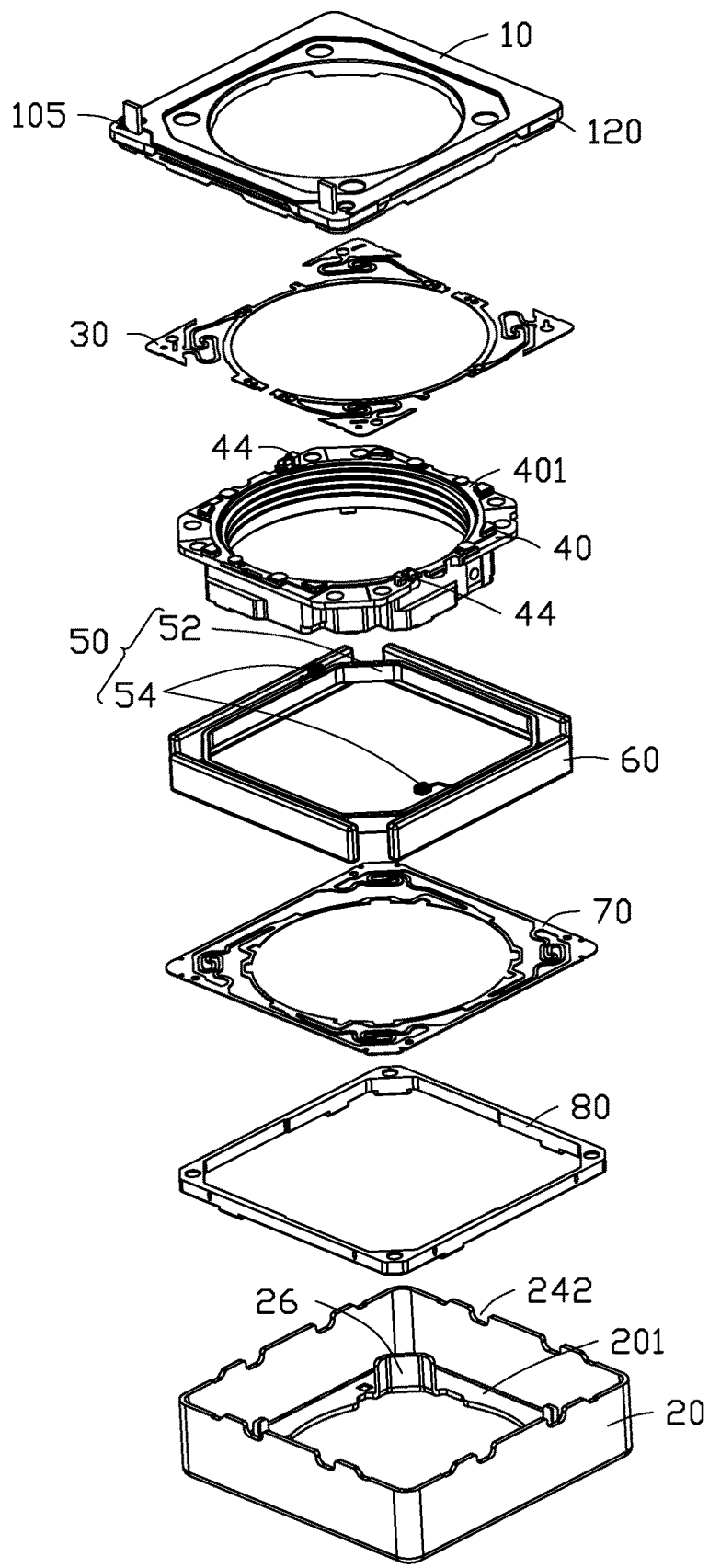
FIG. 3 is an another exploded isometric view of the voice coil motor in FIG. 1.

The pedestal 10 further includes two mounting holes 105, as shown in FIG. 3. A conductive terminal 107 is installed in each mounting hole 105. The conductive terminals 107 are configured to transmit signals between the voice coil motor 100 and external electrical components.

The housing 20 is made of metal. The housing 20 eliminates external electromagnetic interference to the voice coil motor 100 and prevents the voice coil motor 100 electromagnetically interfering with external electronic assembly. The housing 20 includes a top plate 22 and a side plate 24 perpendicularly extending from an edge of the top plate 22. The top plate 22 includes an aperture 220. The top plate 22 and the side plate 24 together form a receiving space 201. The lower elastic member 30, the movable assembly 40, the wire coil 50, the group of magnets 60, the upper elastic member 30, and the fixation frame 80 are received in the receiving space 201.

The housing 20 includes four insert sheets 26 extending inwardly from the rim of the top plate 22. Each insert sheet 26 is arranged to face an interior corner and a length of each insert sheet 26 along the central axis direction is less than a height of the housing 20. The side plate 24 includes four lateral labs 244, lower end of each lateral lab 244 is opened by at least one notch 242. In the illustrated embodiment, each lateral lab 244 has two notches 242, and the two notches 242 are spaced. The housing 20 is mounted on the pedestal 10, and the notch 242 exposes a portion of the first metal sheet 16 and a portion of the second metal sheet 18.

The exposed first metal sheet 16 and the exposed second metal sheet 18 constitute a fixation area 210.

The first metal sheet 16 and the second metal sheet 18 are of metal material, the housing 20 is also of metal material, thus the pedestal 10 can be welded or soldered with the housing 20. Laser or solder is applied on the fixation area 210 to enable the pedestal 10 and the housing 20 to be fixed together by welding or soldering, so as to prevent the housing 20 loosening from the pedestal 10. After welding or soldering on the fixation area 210, the voice coil motor 100 can be turned over 180 degrees, so the pedestal 10 faces upward, and a colloid is applied on the fixation area 210. The colloid can flow along a gap between the pedestal 10 and the housing 20, the colloid enhancing the fixation strength between the pedestal 10 and the housing 20. The first metal sheet 16 and the second metal sheet 18 are able to improve strength of the pedestal 10, thus, thickness of the pedestal 10 can be reduced.

The moveable frame 40 is placed on the lower elastic member 30. The moveable frame 40 includes a receiving through hole 401 configured to receive a lens module (not shown). The moveable frame 40 includes a second flange 42 surrounding the outer wall of the moveable frame 40. Bottom surface 401 of the moveable frame 40 includes two fixation posts 44.

The wire coil 50 is disposed on the second flange 42 and surrounds the moveable frame 40. The wire coil 50 includes a main body 52, and two terminals 54 electrically connected to the main body 52. A terminal 54 is disposed on each fixation post 44, thus the wire coil 50 is fixed with the moveable frame 40.

The group of magnets 60 includes four magnets, and the group of magnets 60 are arranged around the wire coil 50.

The fixation frame 80 is fixed on an inner surface of the top plate 22. The fixation frame 80 is square and configured for fixation the upper elastic member 70. That is, the upper elastic member 70 is fixed between the fixation frame 80 and the top end 44 of the moveable frame 40. The upper elastic member 70 includes a central through hole 701 and four inserting holes 702 surrounding the central through hole 701. When the voice coil motor 100 is assembled, the insert sheet 26 is located in the inserting holes 701. The central through hole 701 is aligned to the aperture 220, the receiving through hole 401, and the bottom through hole 101.

In operation, a current is applied to the wire coil 50, and the movable member 40 moves upwards and downwards in the housing 20 due to electromagnetic interaction between the wire coil 50 and the group of magnets 60.

Figure 4:
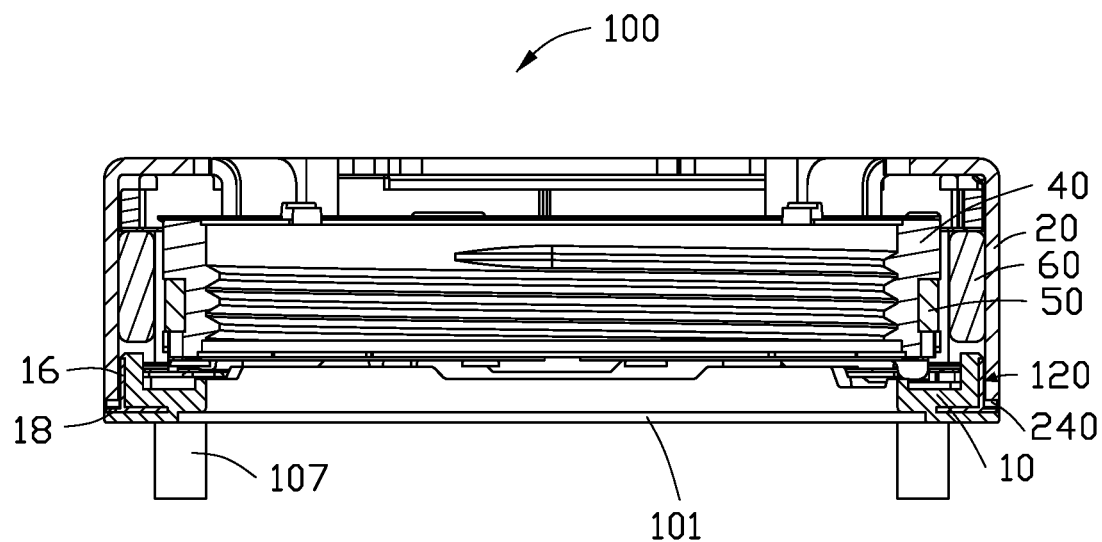
FIG. 4 is a cross-sectional view of the voice coil motor in FIG. 1.
Figure 5:
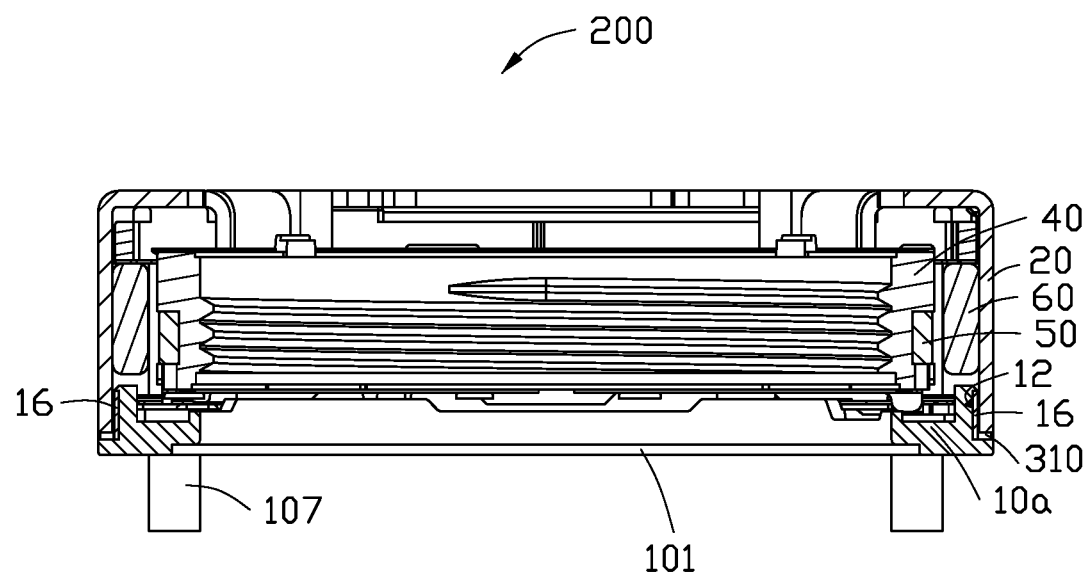
FIG. 5 is a cross-sectional view of a voice coil motor in accordance with one exemplary embodiment.

FIG. 5 illustrates a voice coil motor 200 according to another embodiment. The voice coil motor 200 in FIG. 5 is similar to the voice coil motor 100 in FIG. 4. The difference between the voice coil motor 200 and the voice coil motor 100 in FIG. 4 is that the pedestal 10a only contains a first metal sheet 16 on the side wall 12 before the injection molding process. The first metal sheet 16 constitutes the fixation area 310.

Figure 6:
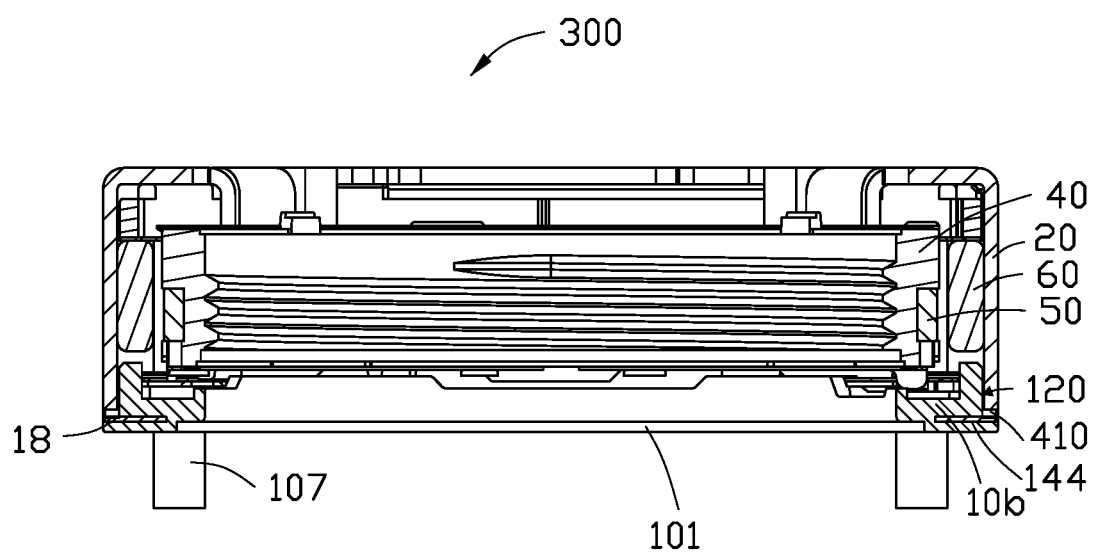
FIG. 6 is a cross-sectional view of a voice coil motor in accordance with one exemplary embodiment.

FIG. 6 illustrates a voice coil motor 300 according to another embodiment. The voice coil motor 300 in FIG. 6 is similar to the voice coil motor 100 in FIG. 4. The difference between the voice coil motor 300 and the voice coil motor 100 in FIG. 4 is that the pedestal 10b only contains the second metal sheet 18 of the stepping surface 144 before injection molding, and the second metal sheet 18 constitutes the fixation area 410.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A voice coil motor comprising:
   a pedestal comprising a side wall and a first flange formed on the side wall, the side wall being formed with a metal sheet, wherein the side wall comprises four side surfaces connected sequentially, the first flange on each side surface is depressed toward bottom of the pedestal to form a cutout, the cutout comprises a stepping surface perpendicular to the side surface, each side wall is formed with a first metal sheet, each stepping surface is formed with a second metal sheet being perpendicular to the first metal sheet; and
   a housing comprising a top plate and a side plate perpendicularly extending from an edge of the top plate, wherein the side plate comprises at least one notch, the housing covers the pedestal, the at least one notch exposes a portion of the first metal sheet and a portion of the second metal sheet, the exposed portions of the first and second metal sheets being formed as a fixation area, and the housing and the pedestal are welded together via the fixation area.

2. The voice coil motor of claim 1, wherein the cutout exposes the center of each side surface.

3. The voice coil motor of claim 2, wherein the first metal sheet is formed on the exposed center of each side surface.

4. The voice coil motor of claim 2, wherein the top surface comprises a number of guiding posts at each corner.

5. The voice coil motor of claim 4, wherein the voice coil motor further comprises a lower elastic member, the lower elastic member is mounted on the pedestal and set up on the guiding posts.

6. The voice coil motor of claim 5, wherein the voice coil motor further comprises a moveable frame, the moveable frame is placed on the lower elastic member, the moveable frame comprises a receiving through hole configured to receive a lens module, the moveable frame comprises a second flange surrounding the outer wall of the moveable frame.

7. The voice coil motor of claim 6, wherein the voice coil motor further comprises a wire coil, the wire coil is disposed on the second flange and surrounds the moveable frame.

8. The voice coil motor of claim 7, wherein bottom surface of the moveable frame comprises two fixation posts, and the two fixation posts extend away from bottom surface of the moveable frame.

9. The voice coil motor of claim 8, wherein the wire coil comprises a main body and two terminals electrically to the main body, the two terminals are set up on the two fixation posts.

10. The voice coil motor of claim 9, wherein the voice coil motor further comprises a group of magnets, the group of magnets comprises four magnets, and the group of magnets are arranged around the wire coil respectively.

11. The voice coil motor of claim 4, wherein the top plate opens an aperture, the housing comprises four insert sheets extending inwardly from the rim of the aperture, each insert sheet is arranged facing each interior corner and a length of each insert sheet along the central axis direction is less than a height of the housing.

12. The voice coil motor of claim 11, wherein further comprises an upper elastic member fixed with the top end of the moveable frame, the upper elastic member comprises a central through hole and four inserting holes surrounding the central through hole, and the insert sheet is located in the inserting holes.

13. The voice coil motor of claim 12, wherein further comprises a fixation frame, the fixation frame is substantially square and fixed between on an inner surface of the top plate and the upper elastic member.

14. The voice coil motor of claim 1, wherein the side plate comprises four lateral sides connected sequentially, lower end of each lateral side is opened with two notches, and the two notches are spaced from each other.

15. The voice coil motor of claim 1, wherein the pedestal is made from plastic.

16. The voice coil motor of claim 1, wherein the housing is made from metal.

* * * * *